United States Patent [19]
Nishikawa et al.

[11] 3,994,361
[45] Nov. 30, 1976

[54] POWER STEERING APPARATUS IN A VEHICLE

[75] Inventors: Masao Nishikawa, Niiza; Yoshihiko Toshimitsu; Takashi Aoki, both of Asaka, all of Japan

[73] Assignee: Honda Giken Kogyo Kabushiki Kaisha, Tokyo, Japan

[22] Filed: Oct. 10, 1975

[21] Appl. No.: 621,941

[30] Foreign Application Priority Data
Oct. 14, 1974  Japan............................. 49-117068

[52] U.S. Cl................................... 180/143; 91/434
[51] Int. Cl.².......................................... B62D 5/08
[58] Field of Search.................. 180/143, 141, 142; 91/434, 370, 371, 372, 373

[56] References Cited
UNITED STATES PATENTS
2,893,504  7/1959  Jackson ............................. 180/143
2,996,136  8/1961  Nallinger et al. .................... 180/143

Primary Examiner—Joseph F. Peters
Assistant Examiner—John A. Pekar
Attorney, Agent, or Firm—Haseltine, Lake & Waters

[57] ABSTRACT

A power steering apparatus of a vehicle having a changeover valve operated in one direction or the other according to the turning of a steering shaft so that a supply oil passage connected to an operational oil pressure source is connected selectively to the left or right chamber of a power cylinder. At least one oil pressure reaction chamber is arranged externally of the changeover valve to be reduced in volume by the operation in either direction of the changeover valve to oppose such operation. A control valve connects the oil pressure reaction chamber to the supply oil passage via a second oil passage. A divergent exhaust oil passage is connected to the second oil passage via a throttle. A control member, such as an exhaust pump, is connected to the exhaust oil passage to produce oil flow therein at a flow rate related to vehicle speed, the control valve including a resilient element acting therein to normally urge the control valve to an open position, excessive oil pressure in the exhaust oil passage acting on the control valve to urge the same to closed position.

10 Claims, 4 Drawing Figures

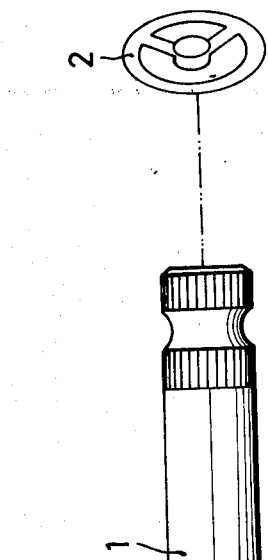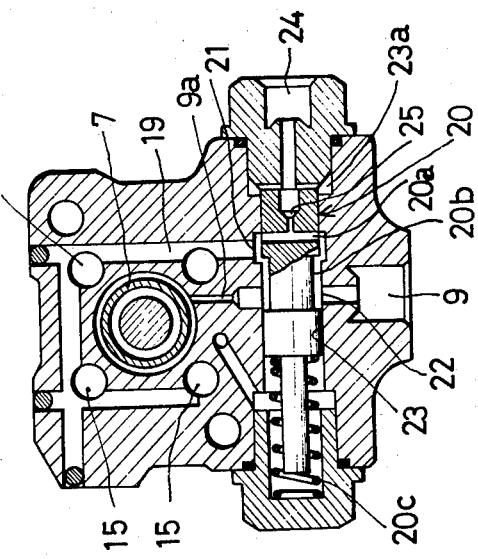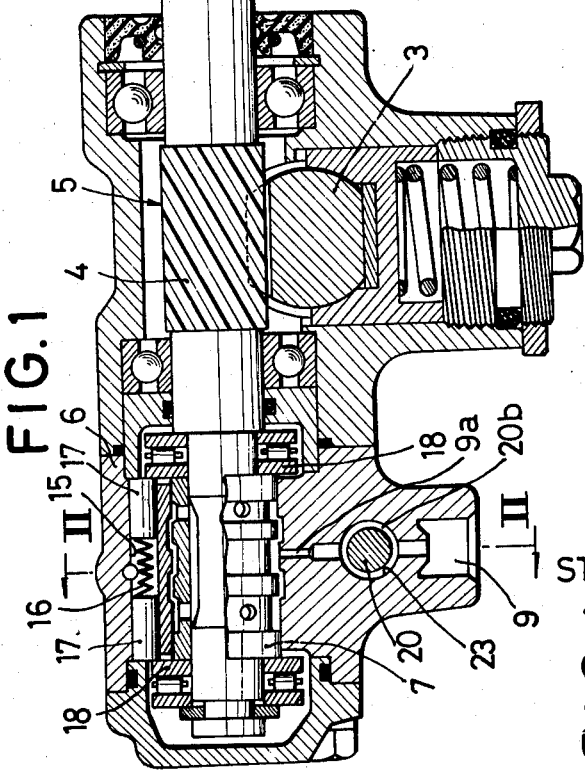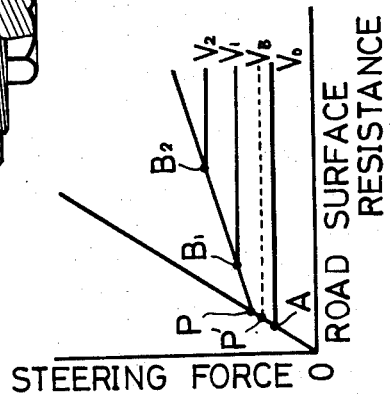

POWER STEERING APPARATUS IN A VEHICLE

FIELD OF THE INVENTION

This invention relates to power steering apparatus in a vehicle, such as a motorcar or the like.

BACKGROUND

An apparatus of this type is known in which a changeover valve is operated in one direction or the other by turning of a steering shaft, so that a supply oil passage connected to an operational oil pressure source, such as an oil pressure pump or the like, may be selectively connected to the left or right chamber of a power cylinder, at least one oil pressure reaction chamber being arranged externally of the changeover valve so as to be reduced in volume by the operation in either direction of the changeover valve to thereby oppose the same, the oil pressure reaction chamber being connected via a control valve to the foregoing supply oil passage, the supply oil passage being provided with a divergent exhaust oil passage connected thereto through a throttle and having at its downstream portion a control member serving to control the flow rate according to vehicle speed, the control valve being constructed so as to move towards its opening side by a differential pressure existing between the supply oil passage and the exhaust oil passage. Thus the oil pressure generated in the supply oil passage in proportion to road surface resistance may be applied to the oil pressure reaction chamber, while being adjusted according to vehicle speed by the action of the control valve.

This conventional construction is advantageous in that, during low speed travel of the vehicle, the steering force required of the driver can be kept at a constant and small value regardless of the change of the road surface resistance, whereby a steering operation can be carried out with a relatively light force, whereas during high speed travel of the vehicle, the steering force can be increased in proportion to the road surface resistance so that oversteering can be effectively prevented. This conventional construction, however, is deficient in that, when the vehicle is driven at a low speed or is at a stop, the foregoing control member is brought into such a condition that the exhaust passage is nearly closed thereby, so that the high oil pressure within the supply oil passage acts on the control member, without being reduced in pressure by the action of the throttle, and thus the control member is subjected to a high load and the durability or life span of the control member is lowered. Furthermore, the control member is often damaged by the high load, and as a result an accurate control according to the vehicle speed cannot be effected thereby.

SUMMARY OF THE INVENTION

It is an object of this invention is to provide an apparatus devoid of the deficiencies noted above.

According to the invention, in an apparatus of the type in which a changeover valve adapted to operate in one direction or the other by turning of a steering shaft, so that a supply oil passage connected to an operational oil pressure source, such as an oil pressure pump or the like, may be selectively connected to the left or right chamber of a power cylinder, at least one oil pressure reaction chamber being arranged externally of the changeover valve to be reduced in volume by the operation in either direction of the changeover valve to oppose operation thereof, the oil pressure reaction chamber being connected to the supply oil passage through a control valve and a second oil passage connecting the oil pressure reaction chamber and the control valve, an improvement is provided in which a divergent exhaust oil passage is connected to the second oil passage through a throttle and having at its downstream portion a control member serving to control the amount of flow according to vehicle speed, the control valve being operable to move towards its open position by an excessive resilient force of a resilient member and towards its closed position by the oil pressure within the exhaust oil passage.

According to a feature of this invention, the control member comprises an exhaust pump driven according to vehicle speed, and a relief valve, which is opened by a predetermined oil pressure, is connected to the exhaust passage in parallel with the exhaust pump.

BRIEF DESCRIPTION OF THE DRAWINGS

FIG. 1 is a sectional side view of one embodiment according to this invention.

FIG. 2 is a sectional view taken along line II—II in FIG. 1.

FIG. 4 is a graph showing the steering characteristic of the embodiment.

DETAILED DESCRIPTION

Figure 3:
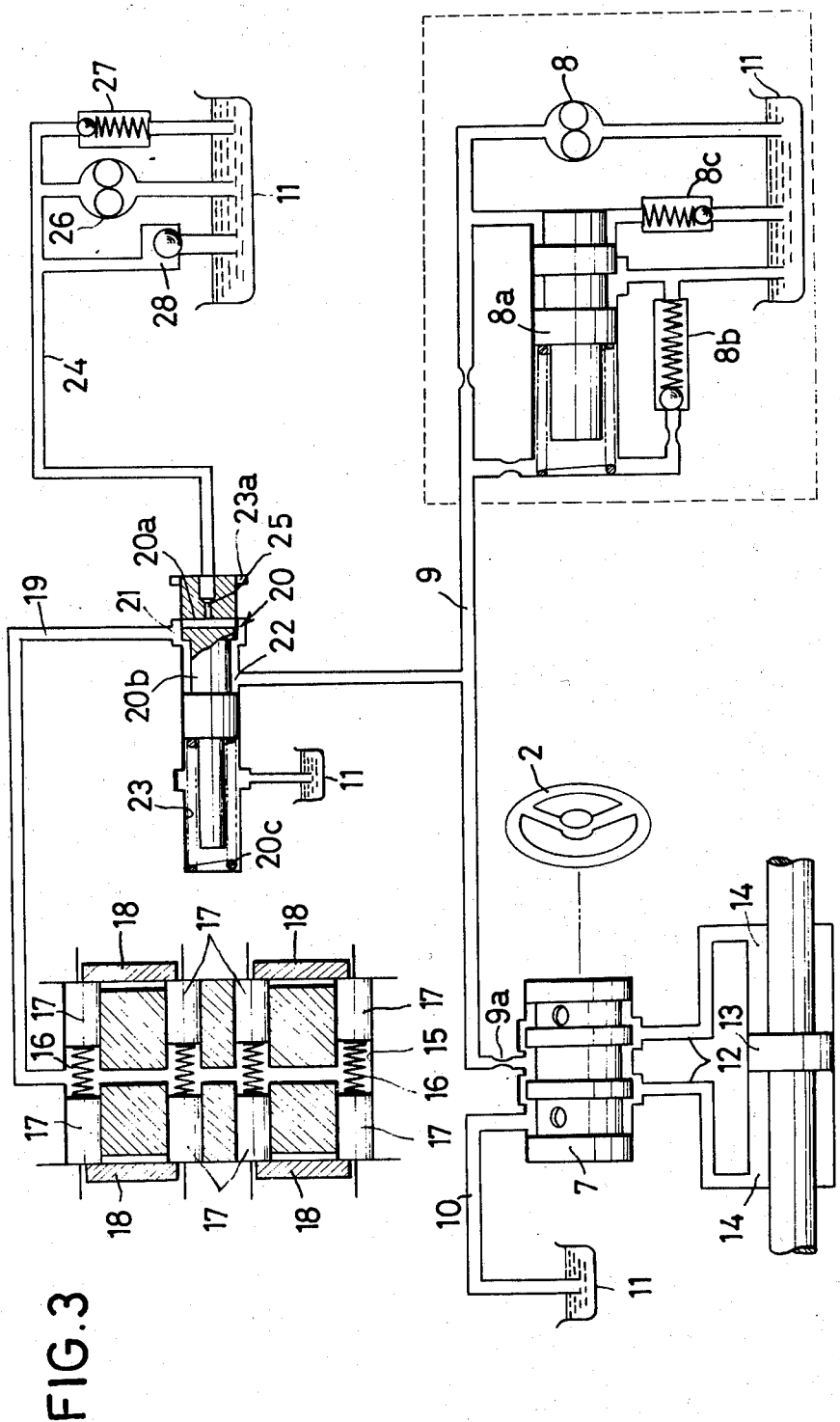
FIG. 3 is a diagrammatic illustration of an oil pressure circuit of the embodiment.

Referring to the drawings, numeral 1 denotes a steering shaft in a vehicle and numeral 2 denotes a steering wheel coupled to the rear portion of the shaft. The steering shaft 1 is extended at its forward end so as to form, in succession, a pinion shaft 5 rotatable therewith with a helical type pinion 4 mounted on shaft 5 and in mesh with a helical type rack 3 supported at one side thereof, and a changeover valve 7 which can be changed over by forward and rearward travel within a valve housing 6 by the longitudinal reaction force acting on the pinion shaft 5. The changeover valve 7 is of the center open type and operates in such a manner that, normally, oil under pressure supplied through a supply oil passage 9 and a throttle 9a from an operational oil pressure source 8, the latter comprising an oil pressure pump driven by the engine, is allowed to pass therethrough, and is via a side exhaust opening 10 to an oil tank 11. Upon forward or rearward sliding movement of the changeover valve 7, however, the oil under pressure is supplied selectively to either one of two opposite chambers 14 of a power cylinder 13 through either of a pair of discharge conduits 12 so as to give a predetermined power assistance to the manual steering operation. As a result, an oil pressure corresponding to road surface resistance acts in the chamber 14 and accordingly, in the supply oil passage 9 connected thereto through the throttle 9a. Numeral 8a denotes a flow control valve so that the amount of oil under pressure to the supply oil passage 9 from the oil pressure source 8 may be kept constant. Numeral 8b denotes a relief valve for preventing excess oil pressure, and numeral 8c denotes a check valve for preventing generation of a negative pressure.

Numeral 15 denotes an oil pressure reaction chamber provided outside the changeover valve 7 and reduced in volume by either of the forward and rearward movements of the valve 7, and a pair of front and rear plungers 17 urged apart by a spring 16 is provided within the oil pressure reaction chamber 15, the plungers 17 being held between a pair of front and rear flanges 18 projecting from the changeover valve 7. In the illustrated embodiment, four of such oil pressure reaction chambers 15 are provided, and these are interconnected through an oil passage 19.

The construction up to this point is conventional.

Numeral 20 denotes a control valve slidably mounted in a valve chamber 23 having on one side an outlet 21 connected to the oil passage 19, and on the other side an inlet 22 connected to the supply oil passage 9. Valve 20 is provided at one end portion with a communication bore or opening 20a arranged to be normally connected to the outlet 21, and valve 20 is also provided at its middle peripheral portion with an annular groove 20b arranged to be normally connected to the inlet 22. The valve 20 is urged towards its opening side, i.e. to the right in the drawing, by the action of a spring 20c acting on the other end of the valve so that the supply oil passage 9 and the oil passage 19 are in communication with one another through the groove 20b.

Additionally, an oil pressure chamber 23a is formed at one end of the control valve 20, and chamber 23a is in communication through an exhaust oil passage 24 with an oil tank 11, the communication opening 20a being in communication through a throttle 25 with the oil pressure chamber 23a. Thus, the oil passage 19 connected to the communication opening 20a and the exhaust oil passage 24 connected to the oil pressure chamber 23a are normally in communication with one another through the throttle 25. The exhaust oil passage 24 is provided at its downstream portion with a control member which serves to control the amount of oil flow according to vehicle speed and which comprises, for instance, an exhaust pump 26 driven by a speedometer-or counter-shaft of the vehicle so that the oil pressure within the exhaust oil passage 24, and accordingly, the oil pressure chamber 23a connected thereto may be controlled according to the vehicle speed, as will be described in detail hereinafter. Thereby the pushing force exerted on the control valve 20 to urge it in its closing direction may be increased or decreased for effecting the opening and closing control of the valve 20. Numeral 27 denotes a relief valve connected to oil passage 24 in parallel with the exhaust pump 26, the relief valve 27 being adapted to be opened when the oil pressure within the exhaust oil passage 24 reaches a predetermined pressure so as to serve to lighten the steering force at the time of reverse driving of the vehicle as will be mentioned hereinafter. Numeral 28 denotes a check valve connected to passage 24 in parallel with pump 26 for preventing the pressure in the exhaust oil passage 24 from becoming negative.

Next, the operation of the apparatus will now be explained as follows:

When the vehicle is at a stop, that is, when a vehicle speed is $V_0$, the exhaust pump 26 is not driven, and the exhaust oil passage 24 is effectively closed. Valve 20 is open and, accordingly, the pressure oil within the oil passage 19, and thereby within the supply oil passage 9 connected thereto through the groove 20b of the control valve 20 does not flow through the exhaust oil passage 24 to tank 11. Consequently, the oil pressures within the supply oil passage 9, the oil passage 19 and the exhaust oil passage 24 are equal and the oil pressure within the passage 24 acts on the oil pressure chamber 23a so as to urge the control valve 20 to its closing side, so that the control valve 20 is moved to its closing side, i.e. to the left in the drawing against the action of the spring 20c; the oil passage 19, and accordingly, the oil pressure reaction chamber 15 connected thereto and the exhaust oil passage 24 are therefore prevented from communicating with the supply oil passage 9. Thus, the oil pressure within the oil pressure reaction chamber 15 and in the exhaust oil passage 24 do not increase above a predetermined oil pressure $P_0$ which moves the control valve 20 to its closing side against the action of the spring 20c. If, at this stage, the steering shaft 1 is turned in either one of two directions, the pinion shaft 5 is rotated and the longitudinal reaction force acting on the pinion shaft 5 moves the changeover valve 7 in a corresponding direction against the action of the spring 16 provided within the oil pressure reaction chamber 15 and the oil pressure $P_0$ acting thereon, so that one side chamber 14 of the power cylinder 13 communicates with the operational oil pressure source 8, and power assistance is given to the manual steering operation. At this stage, an oil pressure corresponding to the road surface resistance is generated in the chamber 14 and also in the supply oil passage 9, but, as mentioned above, the reaction chamber 15 is prevented from communicating with the supply oil passage 9, so that the oil pressure does not act in the oil pressure reaction chamber 15, and accordingly, the steering force required for the driver does not rise above a value determined by the pushing force of the spring 16 within the oil pressure reaction chamber 15 and the oil pressure $P_0$ acting thereon. Thus, the change of the steering force follows the characteristic curve shown by $O$-$A$-$V_0$ in FIG. 4. Here, the knee A is determined by the pushing force caused by the spring 16 within the chamber 15 and the oil pressure $P_0$ acting thereon.

If, the vehicle speed is subsequently increased to $V_1$, the exhaust pump 26 is driven at a speed according to the vehicle speed, and the oil under pressure within the exhaust oil passage 24 flows to the oil tank 11, so that the oil pressure within the exhaust oil passage 24, and accordingly, in the oil pressure chamber 23a connected thereto is decreased, resulting in the control valve 20 being moved in its opening direction by the resilient force of the spring 20c and communication between the oil pressure reaction chamber 15 and the supply oil passage 9 is brought about, and at the time of constant vehicle speed, an oil pressure corresponding to a pressure drop produced in the oil supply passage 9 by the throttle 9a is supplied to the oil pressure reaction chamber 15. If this oil pressure is set to be larger than the foregoing oil pressure $P_0$, the pushing force within the oil pressure reaction chamber 15 is increased, so that the point A moves up to point P. If the changeover valve 7 is operated and an oil pressure corresponding to a road surface resistance is generated in the supply oil passage 9, the oil pressure within the oil pressure reaction chamber 15 is increased in accordance therewith. When, however, the oil under pressure within the oil passage 19 flows into the exhaust oil passage 24 through the throttle 25, and the oil pressure within the exhaust oil passage 24, and accordingly, within the oil pressure chamber 23a connected thereto increases to the foregoing oil pressure $P_0$, the control valve 20 is closed, so that communication between the oil pressure reaction chamber 15 and the supply oil passage 9 is cut off. At this stage, the oil pressure within the oil pressure reaction chamber 15 on the inlet side of the throttle 25 is automatically controlled to that the oil pressure $P_0$ within the exhaust oil passage 24, that is, the pressure on the outlet side of the throttle 25 is added to an oil pressure $\Delta P$ corresponding to a pressure drop generated at the throttle 25. Thus, the characteristic curve becomes $O-P-B_1-V_1$. Here, the point $B_1$ is determined by such a value that the oil pressure $P_0$ is added to the oil pressure corresponding to the pressure drop $\Delta P$ caused by the throttle 25. If the vehicle is driven at a higher speed $V_2$, the exhaust pump 26 is rotatably driven at a speed in accordance therewith, and thus the flow through the throttle 25 is increased according to the increase of the vehicle speed and the pressure drop $\Delta P$ caused at the throttle 25 is increased accordingly thus the oil pressure within the oil pressure reaction chamber 15 at the time the control valve 20 has been closed is increased by a corresponding degree, the point $B_1$ is raised to a point $B_2$ and the characteristic curve then becomes $O-P-B_2-V_2$.

When the vehicle is driven in reverse, the exhaust pump 26 is rotated in the reverse direction and serves as a supply pump, and oil under pressure is supplied into the exhaust oil passage 24, so that the control valve 20 is closed, and a high oil pressure acts on the oil pressure reaction chamber 15 through the throttle 25. If, in this case, the oil pressure reaches a set pressure of the relief valve 27, the relief valve 27 is opened. Therefore, the oil pressure within the exhaust oil passage 24, and accordingly, within the reaction chamber 15 connected thereto through the throttle 25 does not exceed a predetermined pressure, and thus the characteristic curve becomes $O-P'-V_b$. Here, the point $P'$ is determined by the set pressure of the relief valve 28.

In the foregoing embodiment, the throttle 25 is formed integrally with the control valve 20, but the construction is not limited thereto and such a modification can be employed in which the oil passage 19 and the exhaust oil passage 24 are interconnected through a bypass passage with the throttle 25 interposed in such a bypass passage, the oil pressure on the outlet side of the throttle 25 being led to the oil pressure chamber 23a.

The control member need not be an exhaust pump driven in accordance with the vehicle speed, and such means can be provided in which a weight is rotated by a counter shaft or the like at a speed corresponding to the vehicle speed and a needle valve is adapted to be advanced or retracted in accordance with the centrifugal force of the weight, so that the amount of flow to the oil tank 11 can be increased or decreased according to the vehicle speed.

Additionally, the changeover valve 7 in the illustrated embodiment is rearwardly and forwardly slidable, but it will be readily understood that the valve can be of a rotatable type.

Thus, according to this invention, in the case where the vehicle is at a stop or is driven at a low speed, the steering operation can be effected with a constant light force regardless of the change of the road surface resistance, and in the case where the vehicle is driven at a high speed, the steering force is automatically increased according to the road surface resistance and thereby oversteering can be effectively prevented. Additionally, when a steering operation is effected either at low speed driving or high speed driving, the oil pressure within the exhaust oil passage does not exceed a predetermined oil pressure of a magnitude which moves the control valve to its closing position, so that the control member connected to the exhaust oil passage is prevented from being subjected to a high load; its durability can therefore be considerably improved and any damage thereto can be prevented while control of the steering force, according to the vehicle speed, as mentioned above can be reliably effected.

According to a feature of this invention, since the control member is composed of the exhaust pump driven according to the vehicle speed, even if the exhaust pump acts as a supply pump at the time when the vehicle is driven in reverse, the oil pressure, within the oil pressure reaction chamber does not exceed a predetermined oil pressure and thus the steering can be carried out with a light force.

What is claimed is:

1. In a power steering apparatus of a vehicle having a changeover valve operated in one of two directions according to the turning of a steering shaft so that a supply oil passage connected to an operational oil pressure source is connected selectively to the left and right chambers of a power cylinder, at least one oil pressure reaction chamber being arranged externally of the changeover valve to be reduced in volume by the operation in either direction of the changeover valve to oppose such operation, a control valve connecting the oil pressure reaction chamber to the supply oil passage, and a second oil passage connecting the oil pressure reaction chamber and the control valve, an improvement comprising a divergent exhaust oil passage connected to said second oil passage, a throttle between said supply oil passage and said exhaust oil passage, and means connected to said exhaust oil passage to produce oil flow therein at a flow rate and direction according to vehicle speed and direction, respectively, said control valve having open and closed positions and including resilient means acting thereon to normally urge said control valve to the open position for communicating with said supply passage reaction chamber, whereby excessive, oil pressure in said exhaust oil passage acts on said control valve to urge the same to said closed position against said resilient means.

2. An apparatus as claimed in claim 1, wherein said means for producing oil flow in the exhaust oil passage comprises an exhaust pump driven according to vehicle speed, and a relief valve connected to said exhaust passage in parallel with said pump to be opened when a predetermined oil pressure is produced in said exhaust oil passage.

3. An apparatus as claimed in claim 2 comprising a check valve connected to said exhaust passage in parallel with said exhaust pump to prevent negative pressure in said exhaust passage.

4. An apparatus as claimed in claim 1 wherein said control valve has a bore which connects said throttle and exhaust oil passage to said further oil passage.

5. An apparatus as claimed in claim 4 wherein said throttle is in said control valve.

6. An apparatus as claimed in claim 5 wherein said throttle is connected to said bore.

7. An apparatus as claimed in claim 1 wherein said supply passage is connected to said second passage with said control valve in said open position and disconnected therefrom when said control valve is in said closed position.

8. An apparatus as claimed in claim 1 wherein said resilient means comprises a spring.

9. An apparatus as claimed in claim 1 wherein said control valve includes a pressure chamber connected to said exhaust passage to receive the pressure in said exhaust passage which is applied in opposition to the resilient means.

10. An apparatus as claimed in claim 9 wherein said throttle is connected to said pressure chamber.

* * * * *